United States Patent
Eguchi et al.

(10) Patent No.: US 8,014,383 B2
(45) Date of Patent: Sep. 6, 2011

(54) COMMUNICATION SYSTEM

(75) Inventors: Nobuhiko Eguchi, Kawasaki (JP); Kenji Yamada, Yokohama (JP); Kaori Kai, Kasuya (JP)

(73) Assignee: Fujitsu Limited, Kawasaki (JP)

( * ) Notice: Subject to any disclaimer, the term of this patent is extended or adjusted under 35 U.S.C. 154(b) by 1348 days.

(21) Appl. No.: 11/055,669

(22) Filed: Feb. 10, 2005

(65) Prior Publication Data

US 2005/0147085 A1 Jul. 7, 2005

Related U.S. Application Data

(63) Continuation of application No. PCT/JP02/08850, filed on Aug. 30, 2002.

(51) Int. Cl.
*H04L 12/66* (2006.01)

(52) U.S. Cl. ........ 370/352; 370/353; 370/356; 370/359; 370/395.52; 370/260; 709/204; 709/218; 709/229

(58) Field of Classification Search .................. 370/260, 370/352, 464, 353, 356, 359, 395.52
See application file for complete search history.

(56) References Cited

U.S. PATENT DOCUMENTS

| | | | |
|---|---|---|---|
| 4,932,050 A | 6/1990 | Davidson et al. | |
| 6,151,510 A * | 11/2000 | Zicker | 455/414.1 |
| 6,449,269 B1 * | 9/2002 | Edholm | 370/352 |
| 7,298,733 B2 * | 11/2007 | Sakai et al. | 370/352 |
| 7,411,939 B1 * | 8/2008 | Lamb et al. | 370/352 |
| 2001/0012282 A1 | 8/2001 | Yegoshin | |
| 2002/0016174 A1 | 2/2002 | Gibson et al. | |
| 2002/0196782 A1 * | 12/2002 | Furukawa et al. | 370/352 |

FOREIGN PATENT DOCUMENTS

| | | |
|---|---|---|
| EP | 0877 532 | * 11/1998 |
| JP | 11-168773 | 6/1999 |
| JP | 2000-507417 | 6/2000 |
| JP | 2001-177663 | 6/2001 |
| JP | 2001-186240 | 7/2001 |
| JP | 2002-051146 | 2/2002 |
| JP | 2002-084369 | 3/2002 |
| JP | 2002-101198 | 4/2002 |
| WO | WO 97/36442 | 10/1997 |
| WO | WO 98/30008 | 7/1998 |
| WO | WO 01/49060 | 7/2001 |
| WO | WO 01/65786 | 9/2001 |

OTHER PUBLICATIONS

International Search Report dated Oct. 29, 2002.
European Search Report dated Oct. 5, 2005.
Japanese Office Action dated Sep. 12, 2006.

* cited by examiner

*Primary Examiner* — Curtis Kuntz
*Assistant Examiner* — Yosef K Laekemariam
(74) *Attorney, Agent, or Firm* — Fujitsu Patent Center

(57) ABSTRACT

A communication system capable of improving telephone communication service by effectively integrating communications with IP phones and with mobile phones. A connection controller controls a connection interface with a mobile phone and obtains the phone number of the mobile phone being connected thereto. A connect information transmitter transmits connect information including identification information and the phone number. A connect information manager stores and manages the received connect information. When a calling IP phone sends a request to call the mobile phone, a communication controller determines based on the connect information whether the mobile phone is connected to a receiving IP phone. If yes, the communication controller makes a call to the receiving IP phone to establish communication between the calling and receiving IP phones.

7 Claims, 12 Drawing Sheets

COMMUNICATION SYSTEM

CROSS-REFERENCE TO RELATED APPLICATION

This application is a continuing application, filed under 35 U.S.C. §111(a), of International Application PCT/JP2002/008850, filed Aug. 30, 2002, the contents of which are herein wholly incorporated by reference.

BACKGROUND OF THE INVENTION (1) Field of the Invention

This invention relates to a communication system and, more particularly, to a communication system for audio communication over a network.

(2) Description of the Related Art

Recently, as more access circuits including xDSLs, cable internets, optical fibers, and wireless circuits are used in a broadband and network-related devices become increasingly sophisticated, the broadband spreads rapidly. This results in offering various applications and services on an Internet Protocol (IP) network.

Specifically, IP phone (Internet phone) services come into practical use, which realize audio communication over IP networks with a Voice over IP (VoIP) technology. Instead of the existing telephones, IP phones are considered as the feature for cheap communication. Therefore, as a network technology advances, IP phones will increasingly spread.

As the IP phone services spread, more users use both the IP phone services and the mobile phone services. For example, while an IP phone system is set up so as to cover all branches of a company, workers move around with their mobile phones.

There is a conventional technique for Internet phones in which a called Internet phone automatically receives a call even while it is not connected to the Internet through a dial-up connection (for example, Japanese Unexamined Patent Publication No. 2001-177663, paragraph [0025] to [0028], FIG. 1).

In an environment where users can use both IP phones and mobile phones, a caller normally cannot know whether a receiver is near an IP phone. If the caller calls to an IP phone that is considered as being near the receiver and the receiver is not near the IP phone actually, the caller calls the receiver's mobile phone this time. This takes time and is troublesome.

Further, the IP phone network and the mobile phone network are independently set up. Therefore, there are only a few services to make a call from an IP phone to a mobile phone and the services use a gateway to connect the IP network and the mobile phone network. Since a charge for communication between an IP phone and a mobile phone is more expensive than that for communication between mobile phones, what a caller and a receiver who can both use IP phones have communication from an IP phone to a mobile phone is waste of money. In short, callers cannot effectively use the IP phones and the mobile phones if they cannot know whether receivers are near IP phones.

Note that the above-described conventional technique relates to a dial-up connection of Internet phones and is not considered for appropriate integration control of IP phones and mobile phones.

SUMMARY OF THE INVENTION

The present invention has been made in view of foregoing and an object thereof is to provide a communication system capable of improving a telephone communication service by effectively integrating communications with IP phones and with mobile phones.

To achieve the object, the present invention provides a communication system for audio communication over a network. This system comprises: a calling IP phone; a receiving IP phone; and an audio control server, wherein: the receiving IP phone comprises: a connection controller for controlling a connection interface with a mobile phone and obtaining a phone number of the mobile phone being connected to the receiving IP phone; and a connect information transmitter for transmitting connect information including identification information and the phone number when the mobile phone is connected to the receiving IP phone; and the audio control server comprises: a connect information manager for storing and managing the connect information received; and a communication controller for, if determining based on the connect information that the mobile phone is connected to the receiving IP phone when receiving a request to call the mobile phone from the calling IP phone, making a call to the receiving IP phone to establish communication between the calling IP phone and the receiving IP phone.

The above and other features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
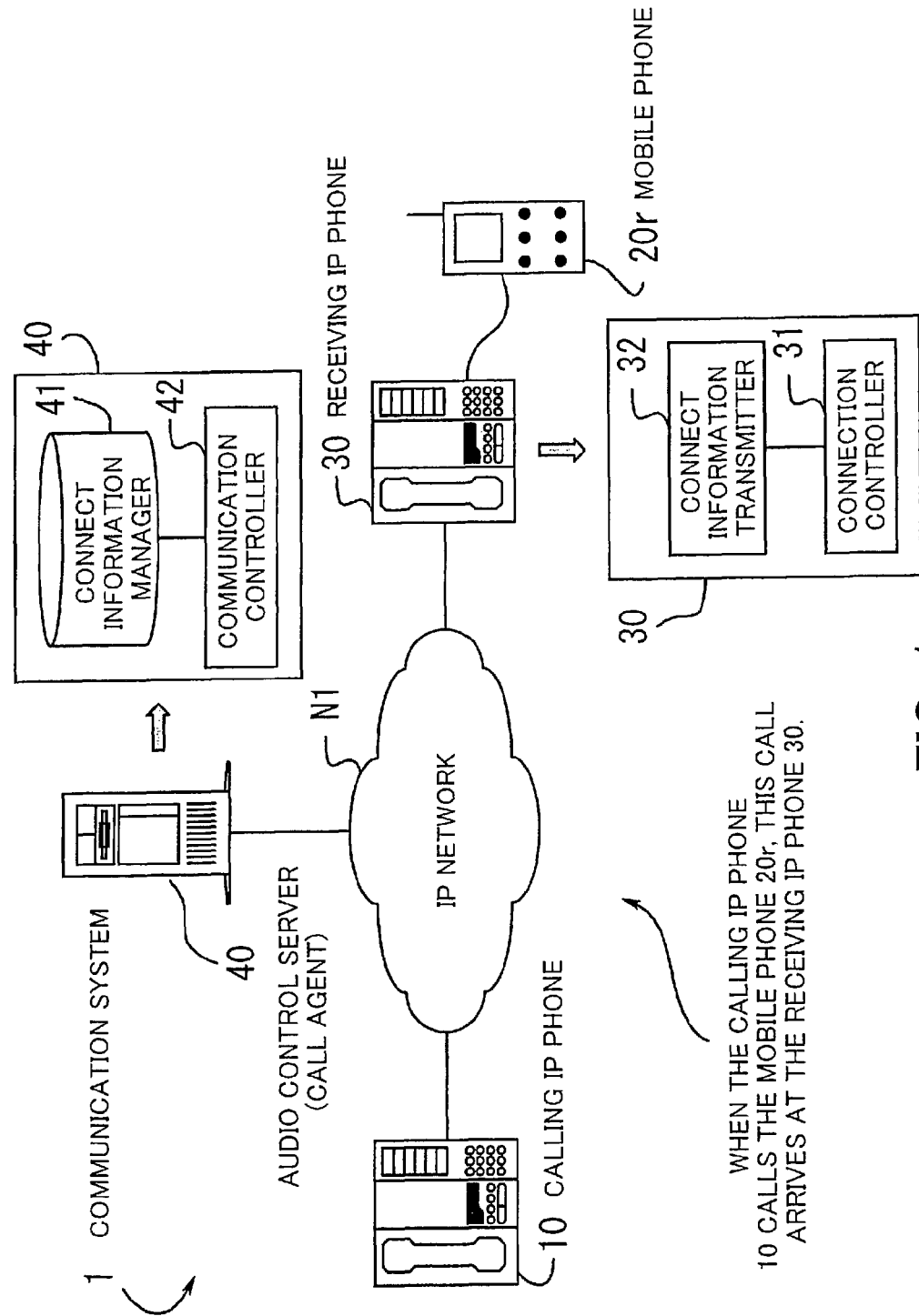
FIG. 1 is a principle view of a communication system of this invention.

Preferred embodiments of this invention will be described below with reference to the accompanying drawings, wherein like reference numerals refer to like elements throughout.

FIG. 1 is a principle view of a communication system of this invention. This communication system 1 is a system for audio communication over an IP network N1 and is composed of a calling IP phone 10, a receiving IP phone 30 to which a mobile phone 20r can connect, and an audio control server 40. In this connection, the calling and receiving IP phones 10 and 30 have the same functions.

The receiving IP phone 30 is composed of a connection controller 31 and a connect information transmitter 32. The connection controller 31 controls a connection interface with the mobile phone 20r, and when the mobile phone 20r is connected thereto, obtains the phone number of this mobile phone 20r. The connect information transmitter 32 informs the audio control server 40 of connect information. This connect information includes identification information and a phone number if obtained. The identification information comprises an IP address and a phone number (IP number). When the audio control server 40 is designed to be capable of converting an IP address to an IP number, the IP number is not necessarily included in the identification information (in other words, when the audio control server 40 performs this conversion, an IP phone does not necessarily give its IP number).

The audio control server 40 is composed of a connect information manager 41 and a communication controller 42. The connect information manager 41 stores and manages connect information received from IP phones over the IP network N1. When receiving a request to call the mobile phone 20r from the calling IP phone 10, the communication controller 42 checks the connect information. If this information indicates that the mobile phone 20r is connected to the receiving IP phone 30, the communication controller 42 makes a call to the receiving IP phone 30 to establish communication between the calling and receiving IP phones 10 and 30.

Note that the audio control server 40 corresponds to a call agent in IP communication using media gateway control protocol (MGCP), or to a gatekeeper when H.323 protocol is used. These cases are different in only a calling procedure and this invention can be applied to both of them. In this description, the audio control server 40 is taken as a call agent 40 (that is, the MGCP is used in processes among the calling IP phone 10, the call agent 40, and the receiving IP phone 30).

As described above, in this communication system 1, if the mobile phone 20r is connected to the receiving IP phone 30 when the calling IP phone 10 calls the mobile phone 20r, this call arrives at the receiving IP phone 30, thereby realizing communication between the IP phones (audio communication over the IP network N1).

Now, IP phones used in this invention will be defined. The IP phones are ones that are used in an audio phone service that is offered in part or all of a network with an IP network technology. IP phone is a higher concept than Internet phone that uses the Internet instead of an IP network and Internet phone is included in IP phone.

The IP phones of this invention are the following devices (1) to (4).

(1) A personal computer which is connected to an IP network (maybe via an access network) and is equipped with a speaker or earphones, and a microphone. Normally, this computer runs software for IP phone.
(2) A general telephone with a special adapter (including a router) being connected to an IP network.
(3) A general telephone with a special adapter being connected to a personal computer being connected to an IP network.
(4) A special IP phone terminal capable of being connected to an IP network.

Figure 2:
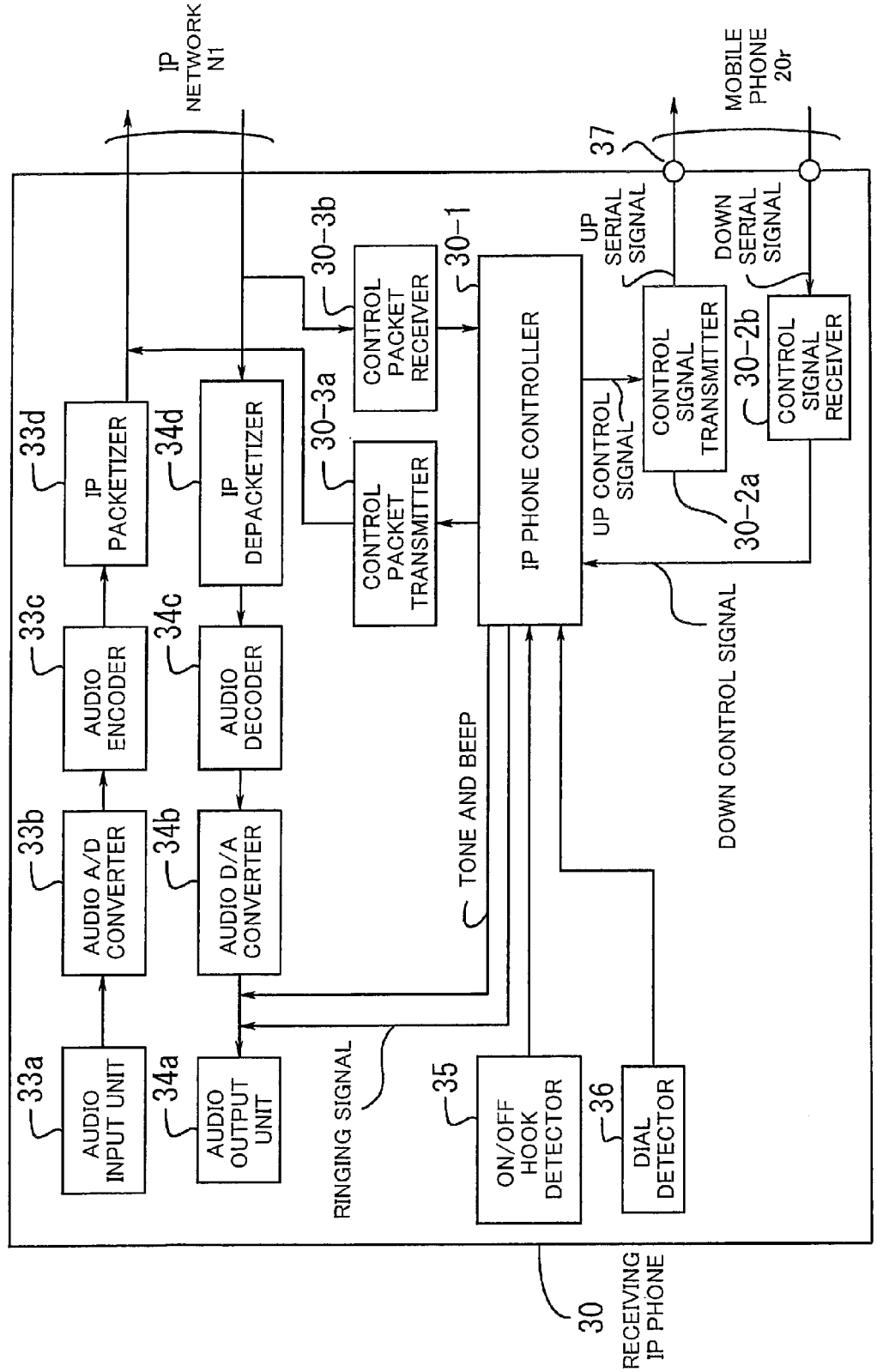
FIG. 2 is a block diagram of a receiving IP phone.

The construction of the receiving IP phone 30 will be now described in detail with reference to FIG. 2 (note that the calling IP phone 10 is identical). The receiving IP phone 30 is composed of an IP phone controller 30-1, a control signal transmitter 30-2a, a control signal receiver 30-2b, a control packet transmitter 30-3a, a control packet receiver 30-3b, an audio input unit 33a, an audio A/D converter 33b, an audio encoder 33c, an IP packetizer 33d, an audio output unit 34a, an audio D/A converter 34b, an audio decoder 34c, an IP depacketizer 34d, an on/off hook detector 35, a dial detector 36, and a phone connector 37.

The audio input unit 33a receives audio from a user. The audio A/D converter 33b digitizes an analog audio signal received from the audio input unit 33a. The audio encoder 33c encodes a digital audio signal received from the audio A/D converter 33b. The IP packetizer 33d converts data encoded by the audio encoder 33c, into IP packets and outputs these to the IP network N1 (transmits VoIP packets). In a case where the packets pass through an access network to the IP network N1, this receiving IP phone 30 has to be equipped with an interface to connect to the access network. However, this matter will not be considered here.

The IP depacketizer 34d receives VoIP packets from the IP network N1 and extracts data. The audio decoder 34c decodes the data received from the IP depacketizer 34b. The audio D/A converter 34b converts the digital audio signal decoded by the audio decoder 34c, into an analog audio signal. The audio output unit 34a outputs the analog audio signal received from the audio D/A converter 34b. In addition, this unit 34a outputs a tone, a beep or a ringing signal under the control of the IP phone controller 30-1.

The control packet transmitter 30-3a outputs a control packet (other than VoIP packets) to the IP network N1 to communicate with the call agent 40 or another IP phone. The control packet receiver 30-3b receives a control packet from the IP network N1 to communicate with the call agent 40 or another IP phone.

The on/off hook detector 35 detects an on-hook state or an off-hook state and notifies the IP phone controller 30-1 of this detected state. The dial detector 36 detects a user's dialed number and notifies the IP phone controller 30-1 of this number. The IP phone controller 30-1 receives various kinds of information detected inside the receiving IP phone 30, and entirely controls the receiving IP phone 30.

The control signal transmitter 30-2a converts an up control signal received from the IP phone controller 30-1, into an up serial signal, and transmits this to the mobile phone 20r via the phone connector 37. The control signal receiver 30-2b receives a down serial signal from the mobile phone 20r via the phone connector 37, and gives it to the IP phone controller 30-1 as a down control signal.

In this connection, the IP phone controller 30-1, the control signal transmitter 30-2a, the control signal receiver 30-2b, and the control packet transmitter 30-3a operate in association with each other, thereby realizing the functions of the connection controller 31 and the connect information transmitter 32 of this invention. As an example, the IP phone controller 30-1 controls the control signal transmitter 30-2a and the control signal receiver 30-2b to detect connection with the mobile phone 20r and obtain its phone number. As another example, the IP phone controller 30-1 controls the control packet transmitter 30-3a to transmit connect information to the call agent 40.

The phone connector 37 serving as an interface to connect the receiving IP phone 30 and the mobile phone 20r may be a 16 core interface for the existing personal digital cellular (PDC) and code division multiple access (CDMA) mobile phones.

The connection of the mobile phone 20r to the receiving IP phone 30 will be now described with reference to FIGS. 3 and 4.

Figure 3:
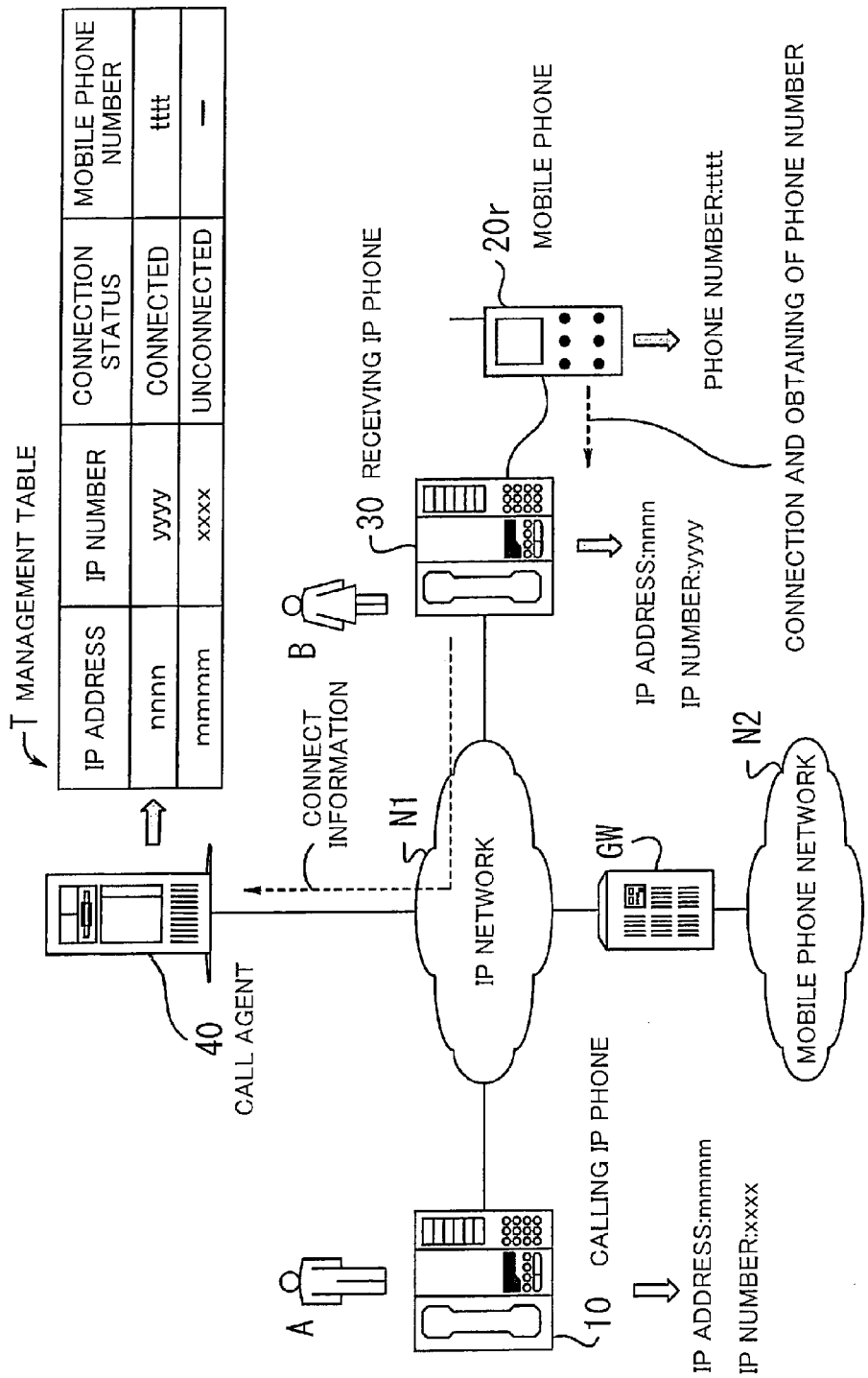
FIG. 3 shows an operation for connection of a mobile phone.

Referring to FIG. 3, over the IP network N1, the calling IP phone 10, the call agent 40, and the receiving IP phone 30 are connected to each other. The IP network N1 and a mobile phone network N2 are connected via a gateway GW. In addition, the mobile phone 20r is connected to the receiving IP phone 30. A caller and a receiver are referred to as a user A and a user B, respectively.

The IP address and the IP number of the calling IP phone 10 are taken as mmmm and xxxx, respectively. The IP address and the IP number of the receiving IP phone 30 are taken as nnnn and yyyy, respectively. And the phone number of the mobile phone 20r is taken as tttt.

The call agent 40 registers connect information given from the receiving IP phone 30, in a management table T of the connect information manager 41. The management table T comprises items for IP address, IP number, connection status, and mobile phone number. This table shows, as an example, that the receiving IP phone 30 with an IP address of nnnn and an IP number of yyyy is connected to the mobile phone 20r with a phone number of tttt.

Figure 4:
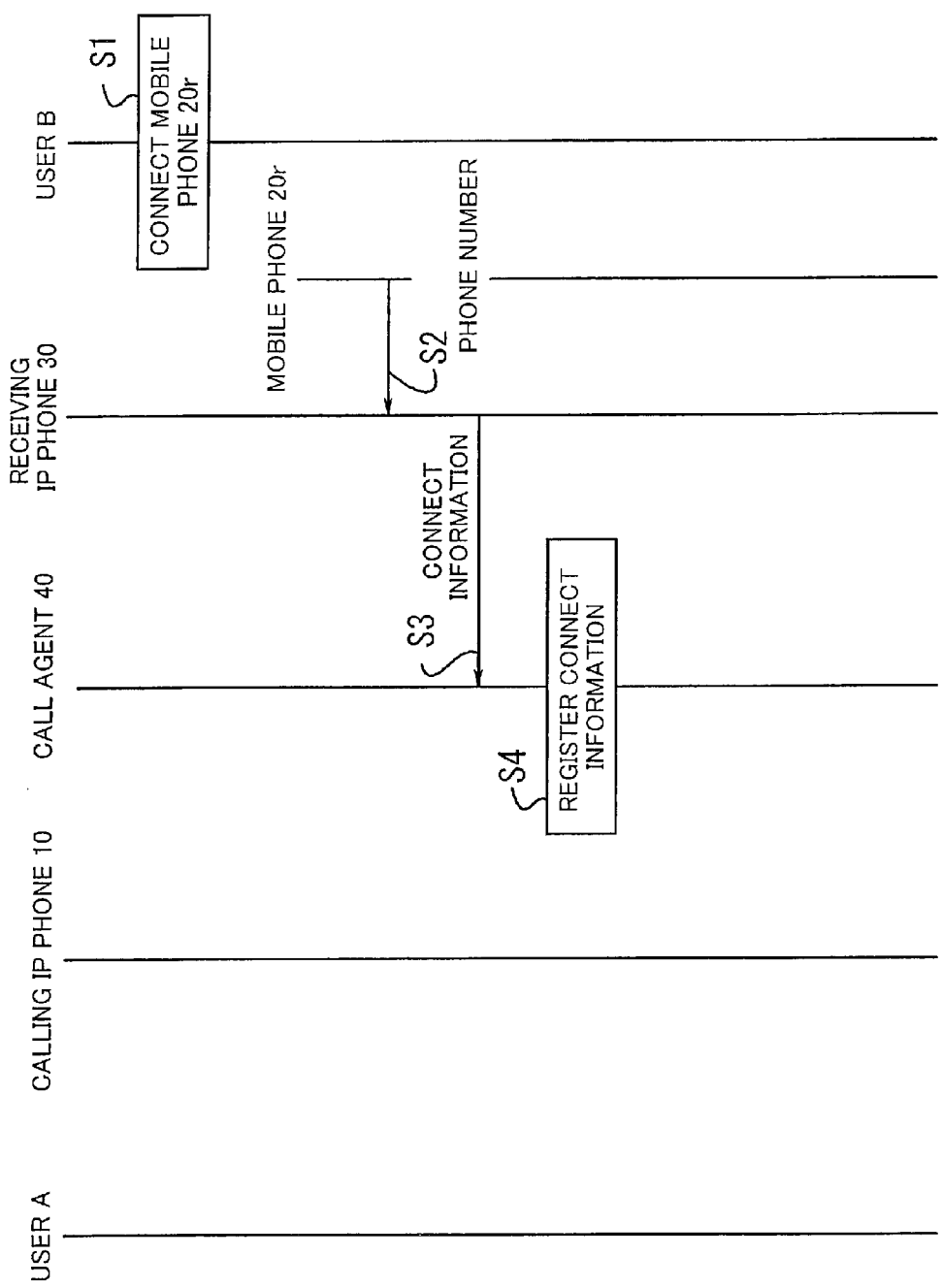
FIG. 4 shows an operation sequence for the connection of the mobile phone.

FIG. 4 shows a sequence of when the mobile phone 20r is connected.

(S1) The user B connects his/her mobile phone 20r to a nearby IP phone (receiving IP phone 30).

(S2) The IP phone 30 which always monitors the connection status of mobile phones with the connection controller 31 obtains the phone number tttt of the mobile phone 20r when this phone 20r is connected thereto.

(S3) The connect information transmitter 32 of the IP phone 30 transmits the obtained phone number, tttt, to the call agent 40 together with its own IP address, nnnn, and IP number, yyyy. Note that the IP number is not necessarily given to the call agent 40 if the call agent 40 is designed to convert an IP address to an IP number.

(S4) The call agent 40 registers the phone number, tttt, in the management table T of the connect information manager 41 in association with the IP address, nnnn, and IP number, yyyy, of the IP phone 30.

In this connection, when the mobile phone 20r is disconnected, the IP phone 30 detects this matter and notifies the call agent 40 together with its own IP address and IP number that the mobile phone 20r has been disconnected. The call agent 40 receives and registers this information in the management table T.

Figure 5:
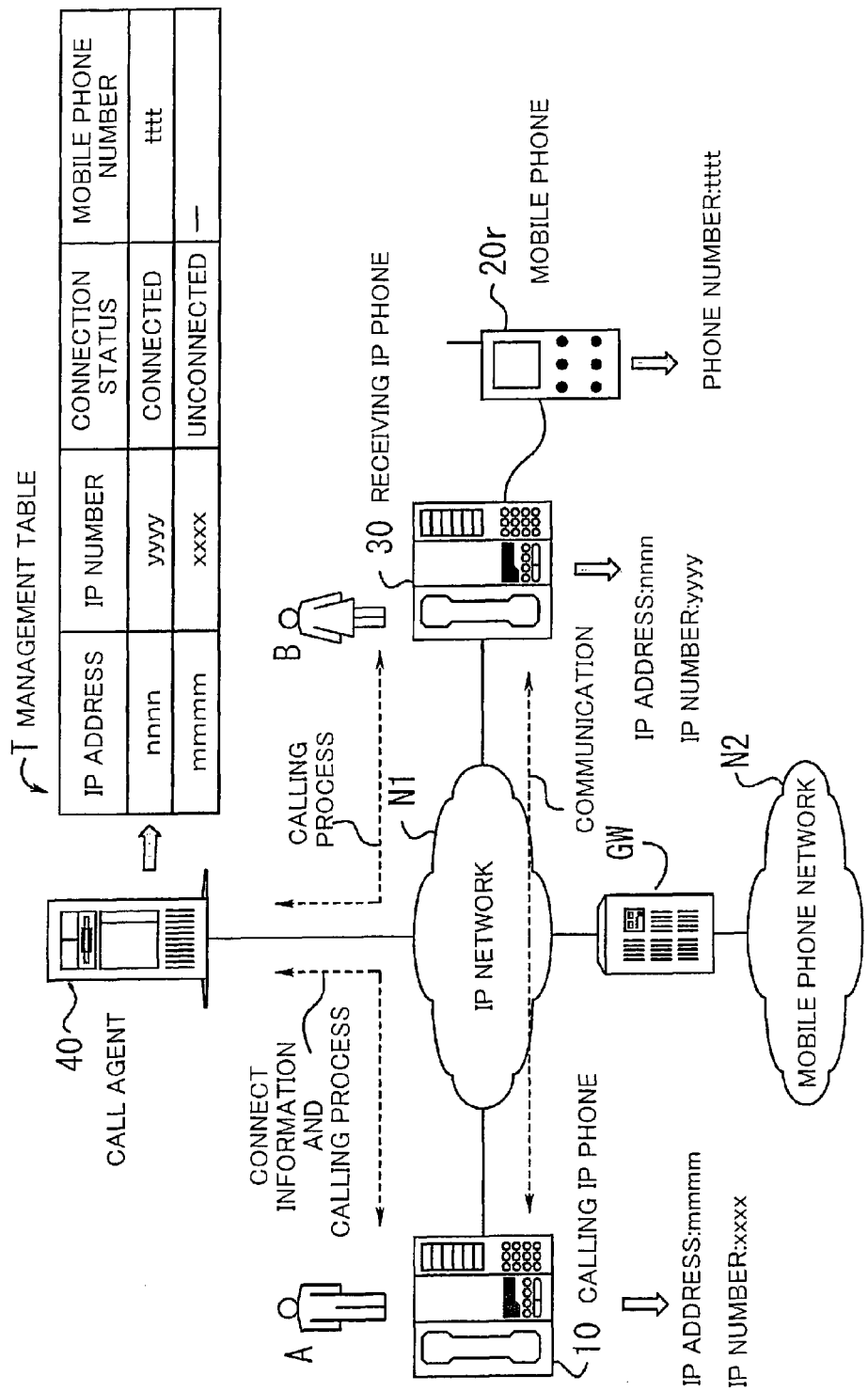
FIG. 5 shows an operation for establishing communication.
Figure 6:
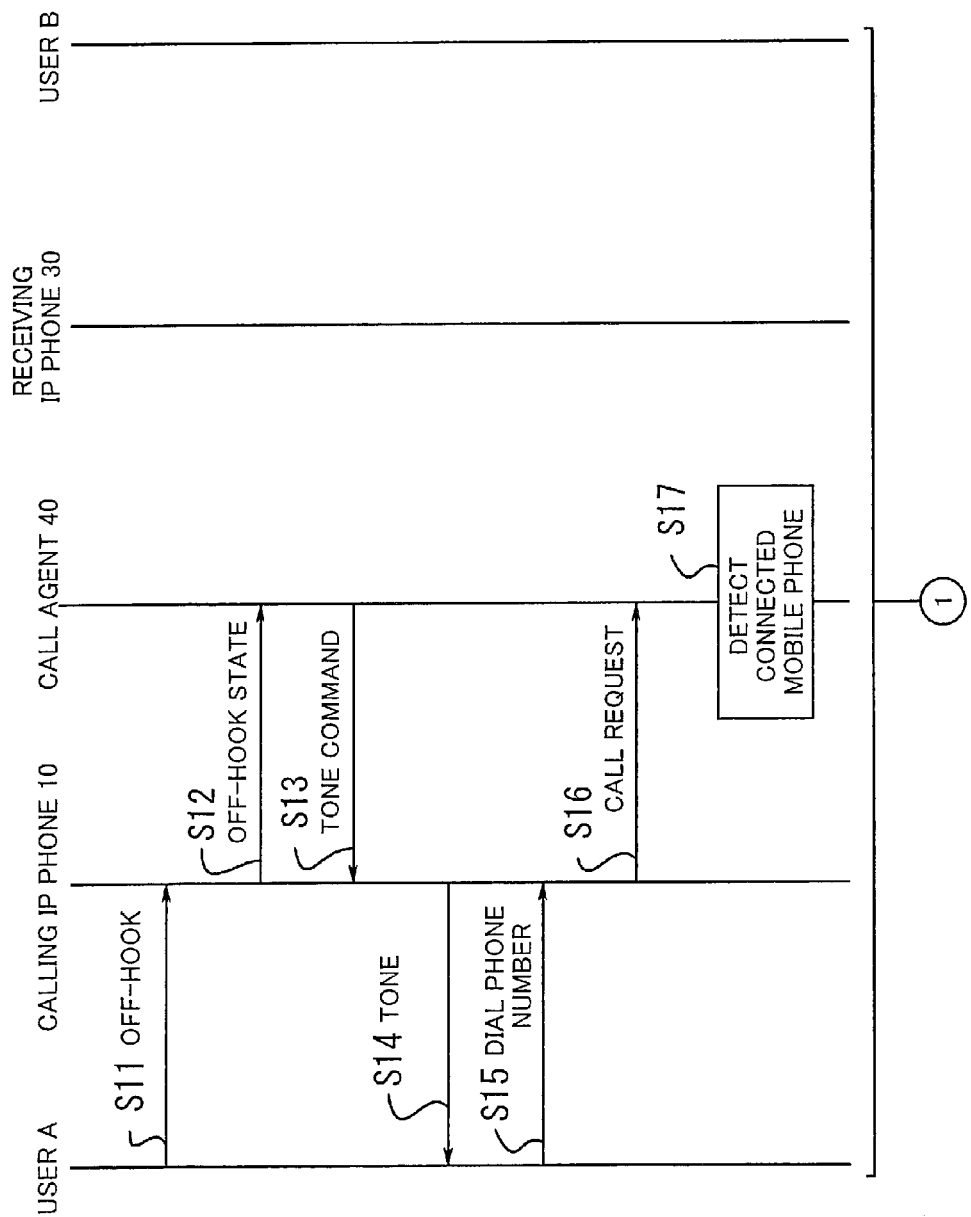
FIGS. 6 and 7 show an operation sequence for establishing the communication.
Figure 7:
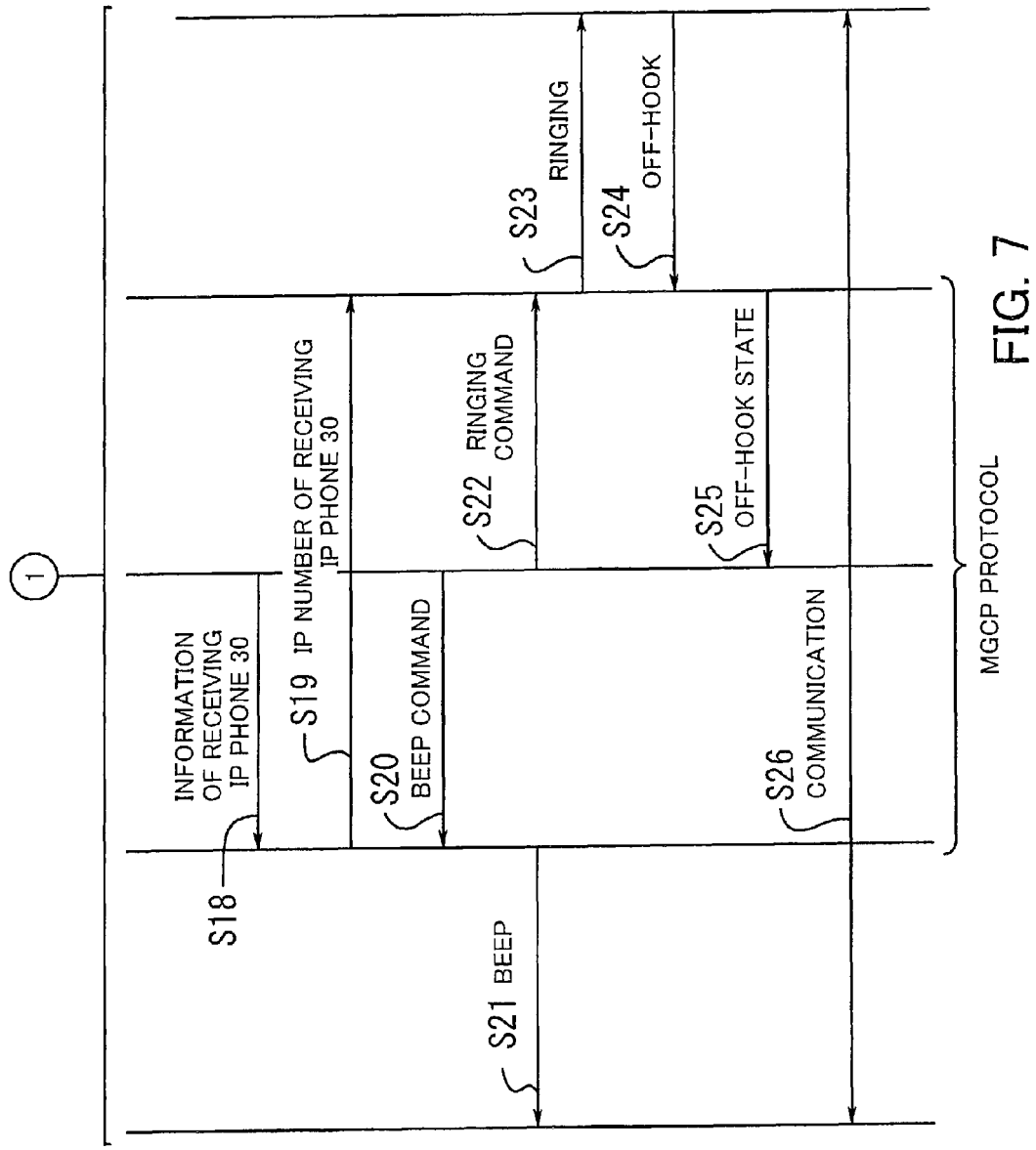

FIGS. 5 to 7 show how to establish communication in a state where the mobile phone 20r is connected. FIG. 5 shows a communication operation and has the same configuration as FIG. 3. FIGS. 6 and 7 show a sequence for establishing the communication. This sequence starts when the user A calls the user B's mobile phone 20r with the calling IP phone 10.

(S11) The user A puts the IP phone 10 off-hook.

(S12) The IP phone 10 notifies the call agent 40 of its off-hook state.

(S13) The call agent 40 sends a tone command to the IP phone 10.

(S14) The IP phone 10 outputs a tone.

(S15) The user A dials the phone number tttt of the mobile phone 20r.

(S16) The IP phone 10 sends a call request to the call agent 40.

(S17) The call agent 40 searches the management table T for the phone number, tttt, to determine which IP phone the mobile phone 20r is connected to. In this example, the call agent 40 recognizes that the mobile phone 20r is connected to the IP phone 30 with an IP address of nnnn and an IP number of yyyy.

(S18) The call agent 40 notifies the IP phone 10 of the IP address, nnnn, and the IP number, yyyy, of the IP phone 30 to which the mobile phone 20r is connected.

(S19) The IP phone 10 notifies the IP phone 30 of the destination's IP number, yyyy.

(S20) The call agent 40 sends a beep command to the IP phone 10.

(S21) The IP phone 10 outputs a beep.

(S22) The call agent 40 sends a ringing command to the IP phone 30.

(S23) The IP phone 30 rings.

(S24) The user B puts the IP phone 30 off-hook.

(S25) The IP phone 30 sends the call agent 40 of the off-hook state.

(S26) The user A and the user B start to communicate by using the IP phones 10 and 30 (a sequence for ending this communication will not be described).

As described above, when the IP phone 10 calls the mobile phone 20r, the IP phone 30, if connected to the mobile phone 20r, receives this call, thereby realizing communication between the IP phones. A big difference between the above communication sequence and the normal MGCP is that the call agent 40 executes steps S17 and S18.

It should be noted that the IP phone 10 can be equipped with a display unit to display information given from the call agent 40 at step SP18 thereon. Such a display unit is very useful in, for example, displaying the connection status of a called mobile phone or the IP number of an IP phone being connected to the mobile phone.

Another embodiment of this invention will be now described. The communication system 1 of this invention described with reference to FIGS. 1 to 7 is a system where, when the calling IP phone 10 calls the mobile phone 20r, the receiving IP phone 30, if connected to the mobile phone 20r, receives this call. The other embodiment, on the other hand, is a case where the mobile phone 20r is not connected to the receiving IP phone 30. In this case, a mobile phone being connected to the calling IP phone 10 directly calls the mobile phone 20r.

Figure 8:
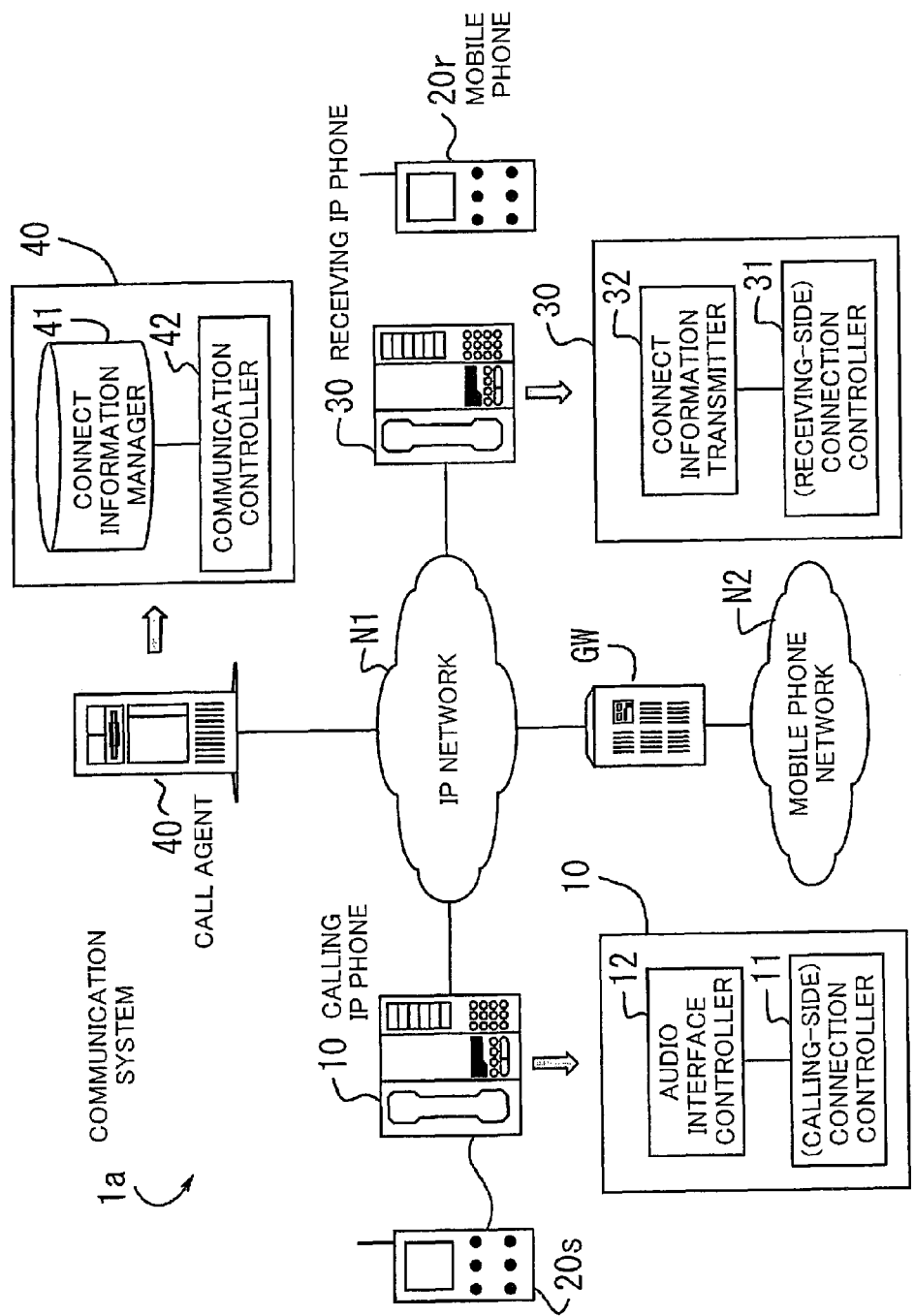
FIG. 8 is a principle view of another communication system of this invention.

FIG. 8 shows a principle of another communication system of this invention. This communication system 1a is composed of a calling IP phone 10 to which a mobile phone 20s can connect, a receiving IP phone 30 to which a mobile phone 20r can connect, and a call agent 40. These are connected over an IP network N1. In addition, the IP network N1 and a mobile phone network N2 are connected via a gateway GW and this communication system 1a is a system for audio communication over the mobile phone network N2.

The calling IP phone 10 is composed of a calling-side connection controller 11 (hereinafter, referred to as connection controller 11, simply) and an audio interface controller 12. The connection controller 11 controls a connection interface with the mobile phone 20s (this controller 11 has various functions, like the above-described connection controller 31). When receiving a connection unable notification, which will be described later, from the call agent 40, the audio interface controller 12 makes the mobile phone 20s call the mobile phone 20r by controlling an audio interface with the mobile phone 20s, in order to establish communication between the mobile phones 20s and 20r.

The receiving IP phone 30 and the call agent 40 are identical to those of FIG. 1 (a receiving-side connection controller 31 is referred to as a connection controller 31, simply). However, if the communication controller 42 of the call agent 40 determines based on connect information that the mobile phone 20r is not connected to the receiving IP phone 30 when receiving a request to call the mobile phone 20r from the calling IP phone 10, this controller 42 sends a connection unable notification to the calling IP phone 30. Then the call agent's process ends.

As described above, this communication system 1a of this invention is a system where, if the mobile phone 20r is not connected to the receiving IP phone 30 when the calling IP phone 10 calls the mobile phone 20r, the mobile phone 20s being connected to the calling IP phone 10 calls the mobile phone 20r to establish communication between the mobile phones (audio communication over the mobile phone network N2).

Figure 9:
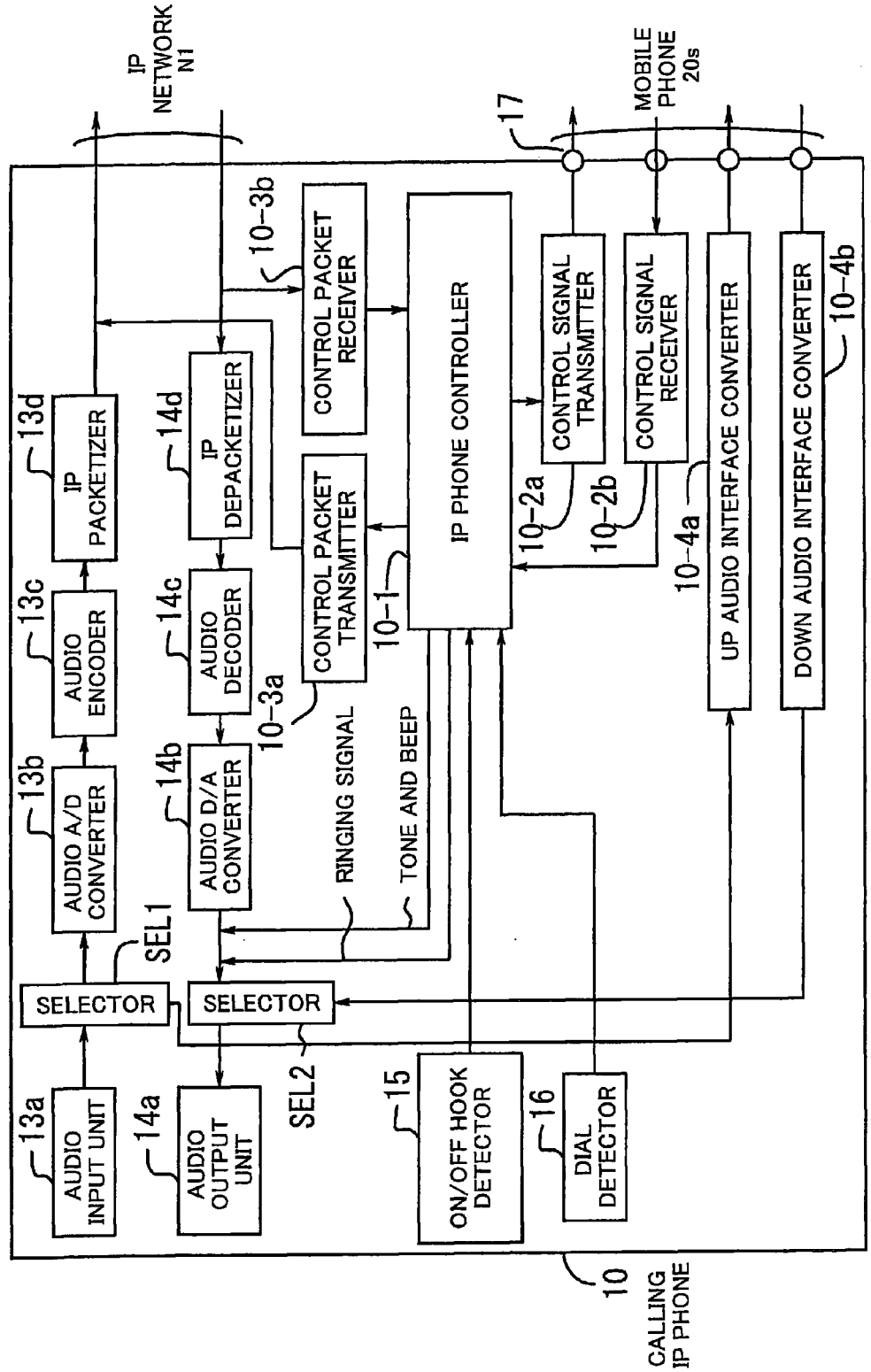
FIG. 9 is a block diagram of a calling IP phone.

The construction of the calling IP phone 10 will be described in detail with reference to FIG. 9 (the receiving IP phone 30 is identical).

In addition to the construction of the IP phone described with reference to FIG. 2, this calling IP phone 10 has a selector SEL1, an up audio interface converter 10-4a, a selector SEL2, and a down audio interface converter 10-4b. Further, a phone connector 17 has an interface for audio signals to be sent and received, in addition to an interface for up/down serial signals. Since the other components are the same (given reference numbers of 10s), only these additional components will be described.

The selector SEL1 selects between the audio A/D converter 13b and the up audio interface converter 10-4a as a destination of an audio input signal under the control of the IP phone controller 10-1. This selector SEL1 normally selects the audio A/D converter 13b. While the IP phone 10 uses the mobile phone 20s to make a call and communication, however, the selector SEL1 selects the up audio interface converter 10-4a. The up audio interface converter 10-4a converts the audio input signal to an audio signal that is then transmitted to the mobile phone 20s.

The selector SEL2 selects a source of an audio signal to be received, under the control of the IP phone controller 10-1. This selector SEL2 normally selects the audio D/A converter 14b. While the IP phone 10 uses the mobile phone 20s to make a call and communication, however, the selector SEL2 selects the down audio interface converter 10-4b. This down audio interface converter 10-4b converts an audio signal received from the mobile phone 20s, into a signal that can be output to the audio output unit 14a.

It should be noted that the IP phone controller 10-1, the control signal transmitter 10-2a, the control signal receiver 10-2b, the up audio interface converter 10-4a, the down audio interface converter 10-4b, and the selectors SEL1 and SEL2 operate in association with each other, thereby realizing the functions of the connection controller 11 and the audio interface controller 12 of this invention.

With the above construction, the calling IP phone 10 is capable of converting between audio signals for the IP phone 10 and audio signals for the mobile phone 20s, and thus the audio input/output units 13a and 14a can allow the mobile phone 20s to be used for communication (that is, by connecting the mobile phone 20s to the calling IP phone 10, a user can use the handset of the calling IP phone 10 to communicate with a user using the mobile phone 20r via the mobile phone 20s). Note that the IP phone controller 10-1 uses the control signal transmitter 10-2a and the control signal receiver 10-2b to control the mobile phone 20s.

Figure 10:
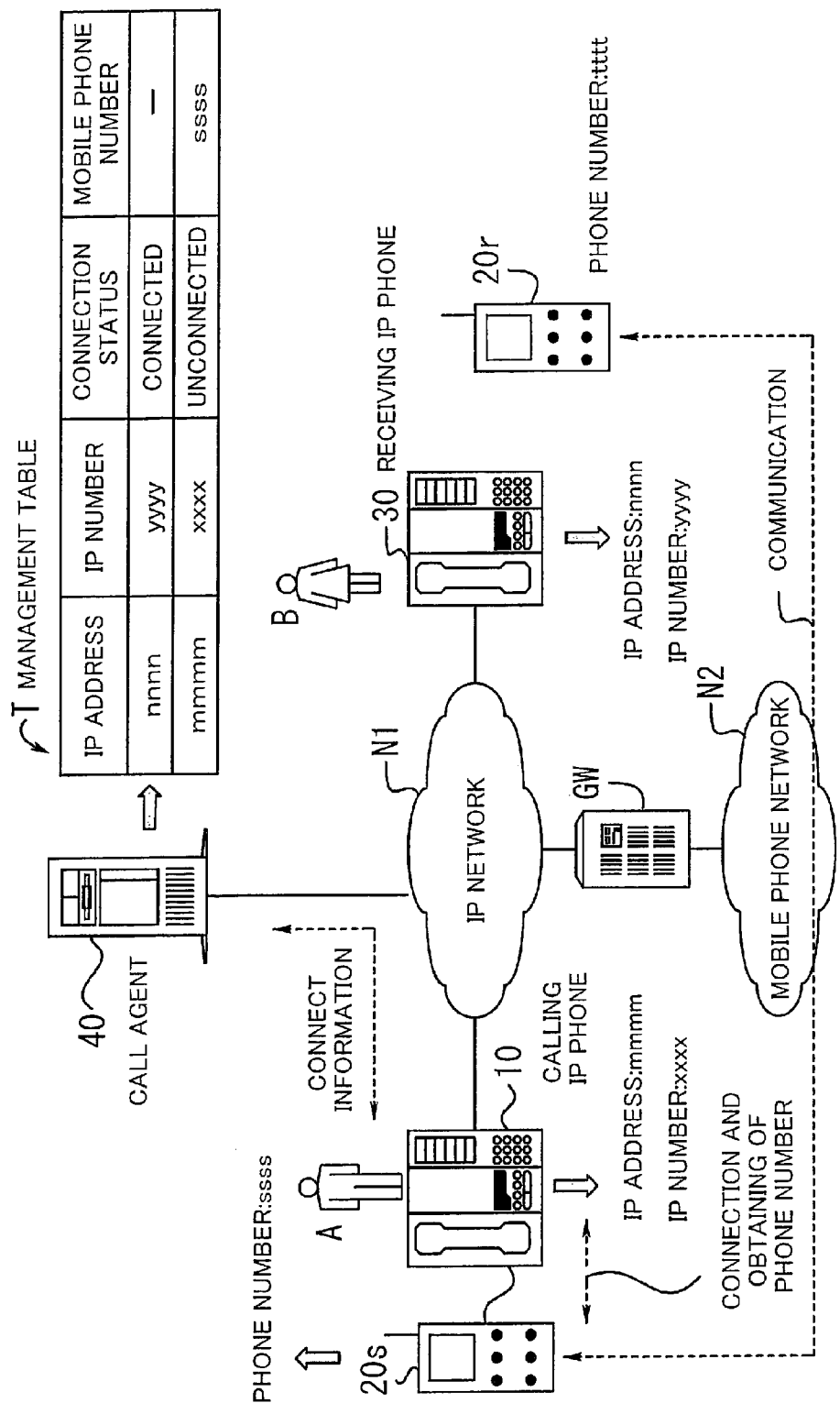
FIG. 10 shows an operation for making a call from a mobile phone.
Figure 11:
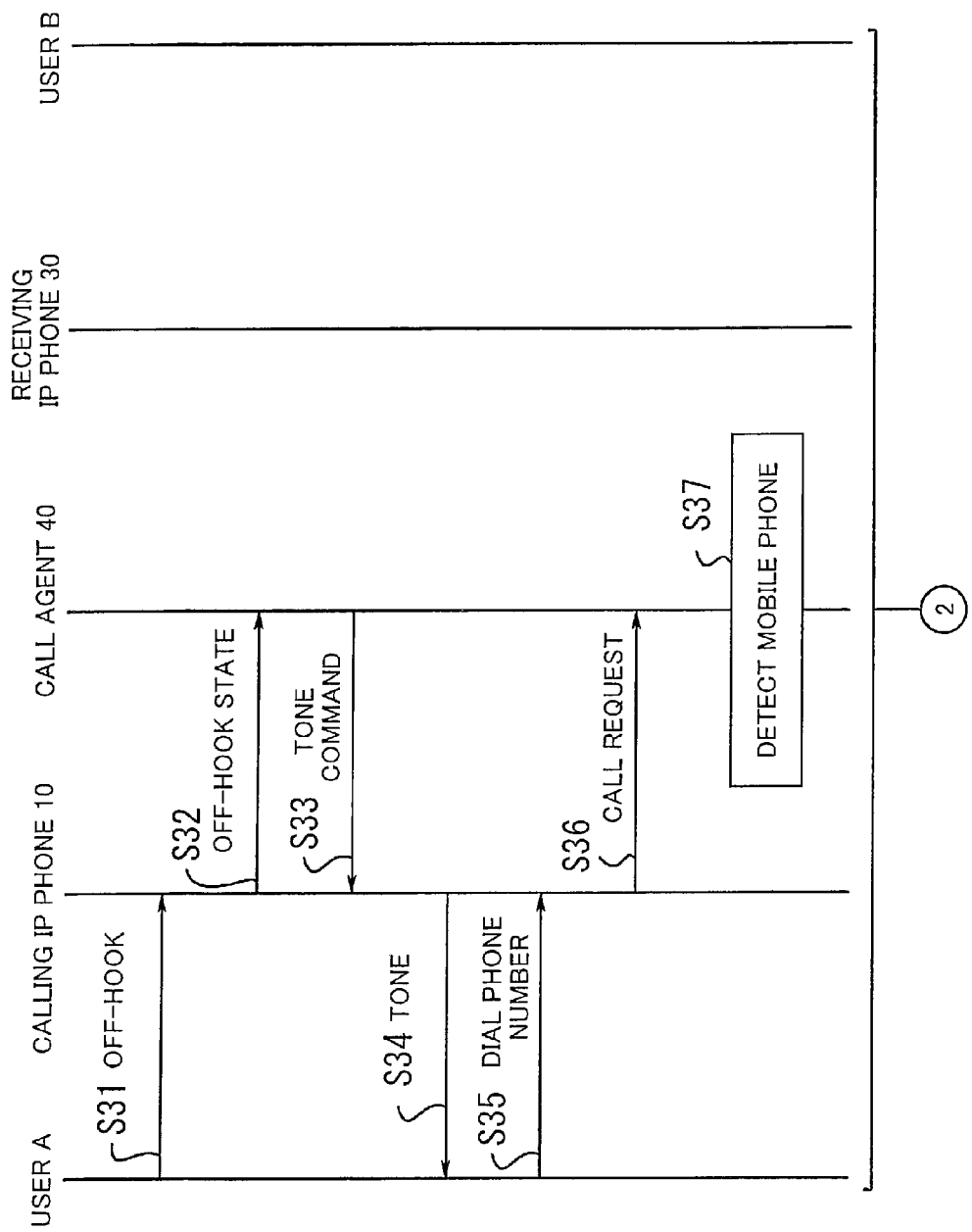
FIGS. 11 and 12 show an operation sequence for making a call from the mobile phone.
Figure 12:
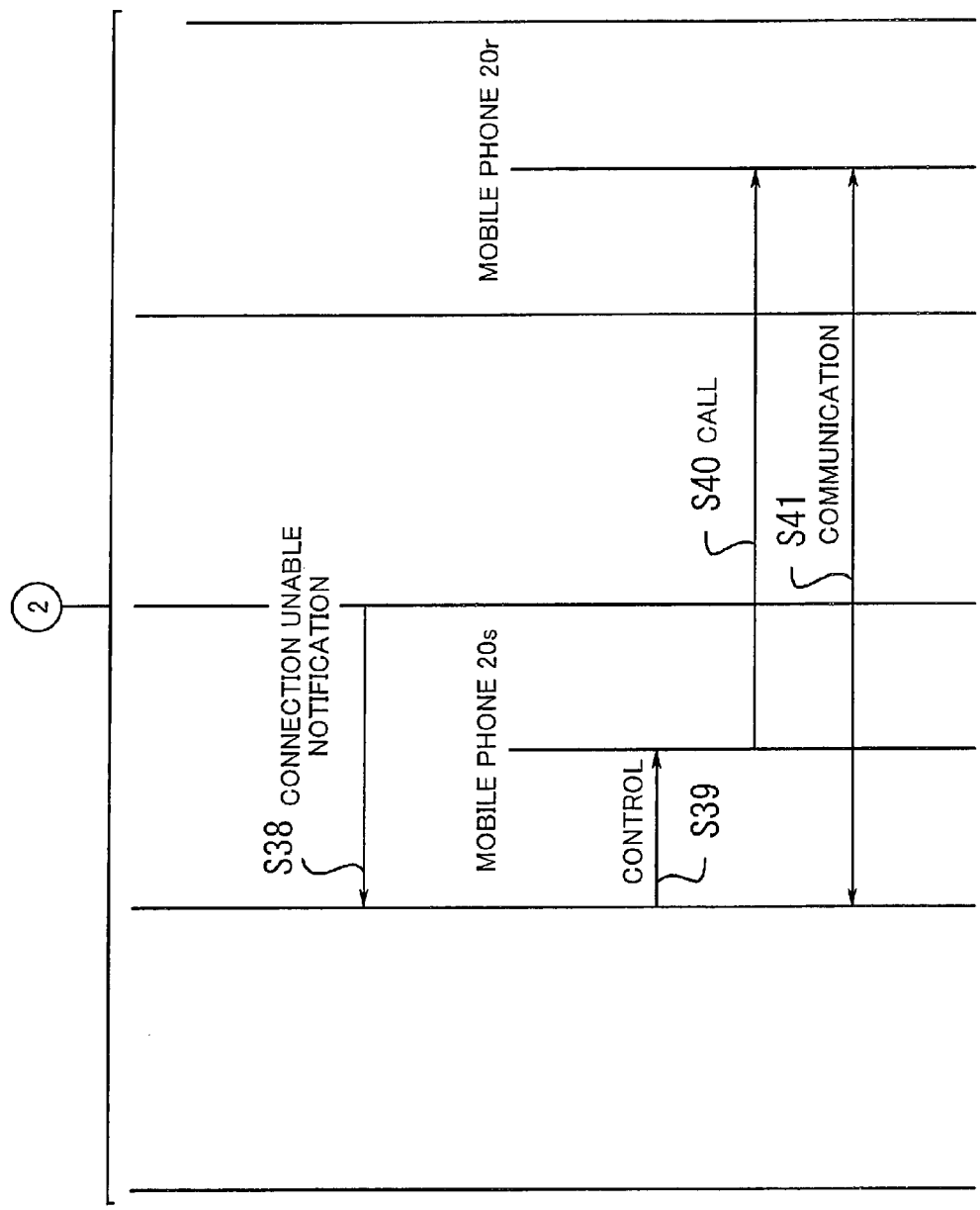

FIGS. 10 to 12 show how the mobile phone 20s being connected to the calling IP phone 10 makes a call. FIG. 10 has the same configuration as FIG. 8. In addition, the management table T of the connect information manager 41 of the call agent 40 shows that the mobile phone 20s with a phone number of ssss is connected to the calling IP phone 10 with an IP address of mmmm and an IP number of xxxx.

FIGS. 11 and 12 show an operation sequence of how the mobile phone 20s makes a call.

(S31) The user A puts the IP phone 10 off-hook.
(S32) The IP phone 10 notifies the call agent 40 of the off-hook state.
(S33) The call agent 40 sends a tone command to the IP phone 10.
(S34) The IP phone 10 outputs a tone.
(S35) The user A dials the phone number tttt of the mobile phone 20r.
(S36) The IP phone 10 sends a call request to the call agent 40.
(S37) The call agent 40 searches the management table T for the phone number tttt. In this example, this agent 40 determines that this number has not been registered. Simultaneously, the call agent 40 recognizes from the management table T that the calling IP phone 10 is connected to the mobile phone 20s.
(S38) The call agent 40 notifies the IP phone 10 that the mobile phone 20r is not connected to any IP phone. Then the call agent's process ends.
(S39) The IP phone 10 receiving a connection unable notification at step S38 controls the mobile phone 20s being connected thereto, so as to call the phone number tttt.
(S40) The mobile phone 20s calls the mobile phone 20r (over the mobile phone network N2).
(S41) The user B puts the mobile phone 20r off-hook, thereby establishing communication between the users A and B. Although the mobile phone 20s is actually used for this communication, the user A can continue to use the audio input unit 13a and the audio output unit 14a of the IP phone 10 for the communication. A sequence for ending this communication will not be described.

According to this operation sequence, if the mobile phone 20r is not connected to the IP phone 30 when the IP phone 10 calls the mobile phone 20r (if the IP phone 10 receives a connection unable notification from the call agent 40), the mobile phone 20s being connected to the IP phone 10 is used to call the mobile phone 20r, thereby establishing communication between the mobile phones.

In the above description, the calling IP phone 10 automatically uses the mobile phone 20s being connected thereto, to make a call. Alternatively, the calling IP phone 10 can have a function for setting information indicating whether to permit the use of the mobile phone 20s to make a call. In this case, this information is given to the call agent 40 as well and if the information indicates permission, the above operation is executed. If the information indicates prohibition, the call agent 40 makes a call so as to establish communication between the mobile phones 20s and 20r.

A case where the mobile phone 20s is not connected to the IP phone 10 in the communication system 1a will be now described. If the call agent 40 detects that the mobile phone 20r is not connected to any IP phone, the agent 40 makes a call to the mobile phone 20r by connecting the IP network N1 and the mobile phone network N2 via the gateway GW (this is a conventional technique).

Another case where a plurality of mobile phones are connected to the calling IP phone 10 in the communication system 1a will be now described. In this case, the audio interface controller 12 of the calling IP phone 10 selects and controls one out of the plurality of mobile phones to make a call.

Further, in the above description, a connection interface between an IP phone and a mobile phone is shown by a wired line (16 core interface for PDC and CDMA mobile phones). Alternatively, a radio interface such as Bluetooth can be used.

According to this invention, if a mobile phone is connected to a receiving IP phone when a calling IP phone calls the mobile phone, the receiving IP phone receives this call to establish communication between the IP phones, which reduces a call charge. In other words, while a receiver's mobile phone is connected to an IP phone, this IP phone receives calls made to the receiver's mobile phone. That is, a caller can just call the receiver's mobile phone without considering where the receiver is. Similarly, the caller also can receive calls via his/her IP phone. This is very convenient.

Furthermore, while a receiver does not connect his/her mobile phone to an IP phone (since there is no IP phone near the receiver and the receiver carries his/her mobile phone), the call agent notifies a calling IP phone of this situation. The calling IP phone then uses a mobile phone being connected thereto, to call the receiver's mobile phone, thereby establishing communication between the mobile phones. This can also reduce a call charge as compared with communication from an IP phone to a mobile phone.

The operation sequences of this invention have been described with the MGCP. Alternatively, H.323 protocol can be used. In this case, instead of the call agent, a gatekeeper is installed to make a call.

As described above, a communication system of this invention is composed of a calling IP phone, a receiving IP phone with a function to give connect information when a mobile phone is connected thereto, and an audio control server. When the calling IP phone sends a request to call the mobile phone, the audio control server makes a call to the receiving IP phone when the connect information indicates that the mobile phone is connected to the receiving IP phone. That is, while a receiver's mobile phone is connected to an IP phone, the IP phone receives calls made to the receiver's mobile phone. A caller can just call the receiver's mobile phone without considering where the receiver is. Communication can be made cheaper by using IP phones and thus a service for telephone communication can be improved.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for audio communication over a network, comprising:
   a first IP phone;
   a second IP phone; and
   an audio control server, wherein:
   the second IP phone comprises:
      a receiving-side connection controller to control a receiving-side connection interface with a receiver's mobile phone and to obtain a phone number of the receiver's mobile phone being connected to the second IP phone; and
      a connect information transmitter to transmit connect information including identification information and the phone number when the receiver's mobile phone is connected to the second IP phone;
   the audio control server comprises:
      a connect information manager to store and manage the connect information received; and
      a communication controller, once determining based on the connect information that the receiver's mobile phone is not connected to the second IP phone when receiving a request to call the receiver's mobile phone from the first IP phone, to transmit a connection unable notification to the first IP phone; and
   the first IP phone comprises:
      a calling-side connection controller to control a calling-side connection interface with a caller's mobile phone; and
      an audio interface controller, when sending the request to the audio control server to call the receiver's mobile phone and receiving the connection unable notification, to cancel the request to the audio control server and to request the caller's mobile phone being connected to the first IP phone to call the receiver's mobile phone through a mobile phone network which bypasses the first IP phone, so as to establish communication between the caller's mobile phone and the receiver's mobile phone, wherein the first IP phone communicates with the receiver's mobile phone through the caller's mobile phone and the mobile phone network.

2. The communication system according to claim 1, wherein:
   the audio control server notifies the first IP phone of the connect information; and
   the first IP phone shows information received, to a caller.

3. The communication system according to claim 1, wherein the calling-side connection controller and the receiving-side connection controller use radio interfaces to connect with the caller's mobile phone and the receiver's mobile phone as the calling-side connection interface and the receiving-side connection interface.

4. The communication system according to claim 1, wherein the first IP phone has a function for setting information indicating whether to permit an automatic call from the caller's mobile phone being connected to the first IP phone, and notifies the audio control server of the information set, wherein
   a call is made from the first IP phone when the information indicates permission or from the audio control server when the information indicates prohibition.

5. The communication system according to claim 1, wherein:
   the calling-side connection controller has the connection interface with a plurality of callers' mobile phones; and
   the audio interface controller selects an appropriate caller's mobile phone out of the plurality of callers' mobile phones and requests the selected caller's mobile phone to call the receiver's mobile phone when receiving the connection unable notification in a case where the plurality of callers' mobile phones are connected to the first IP phone.

6. An IP phone for audio communication over a network, comprising:
   a connection controller to control a connection interface with a mobile phone and to obtain a phone number of the mobile phone being connected to the IP phone;
   a connect information transmitter to transmit connect information including identification information and the phone number when the mobile phone is connected to the IP phone; and
   an audio interface controller, when sending a request to an audio control server to call a receiver's mobile phone and receiving a connection unable notification indicating that the receiver's mobile phone is not connected to another IP phone, to cancel the request to the audio control server and to request the mobile phone being connected to the IP phone to call the receiver's mobile phone through a mobile phone network which bypasses the IP phone, so as to establish communication between the mobile phone and the receiver's mobile phone, wherein the IP phone communicates with the receiver's mobile phone through the mobile phone and the mobile phone network.

7. A telephone communication method for audio communication with telephones over a network, comprising:

controlling a connection interface with a receiver's mobile phone and obtaining a phone number of the receiver's mobile phone being connected to a second IP phone;

transmitting connect information including identification information and the phone number when the receiver's mobile phone is connected to the second IP phone;

storing and managing the connect information received;

transmitting a connection unable notification to a first IP phone once it is determined based on the connect information that the receiver's mobile phone is not connected to the second IP phone when the first IP phone sends a request to an audio control server to call the receiver's mobile phone; and cancelling the request sent from the first IP phone to the audio control server, and establishing communication between a caller's mobile phone being connected to the first IP phone and the receiver's mobile phone by requesting the caller's mobile phone to call the receiver's mobile phone through a mobile phone network which bypasses the first IP phone, when the connection unable notification is transmitted, wherein the first IP phone communicates with the receiver's mobile phone through the caller's mobile phone and the mobile phone network.

* * * * *